United States Patent
Kim et al.

(10) Patent No.: US 6,301,251 B1
(45) Date of Patent: Oct. 9, 2001

(54) ATM COMMUNICATIONS SYSTEM, UBR-ABR GATEWAY, AND METHOD

(75) Inventors: Hyong S. Kim; Stephen J. Vogelsang, both of Pittsburgh, PA (US)

(73) Assignee: FORE Systems, Inc., Warrendale, PA (US)

( * ) Notice: Subject to any disclaimer, the term of this patent is extended or adjusted under 35 U.S.C. 154(b) by 0 days.

(21) Appl. No.: 09/025,928

(22) Filed: Feb. 19, 1998

(51) Int. Cl.[7] .................................................. H04L 12/28
(52) U.S. Cl. ............................................ 370/395; 370/466
(58) Field of Search .................................. 370/395, 229, 370/234, 236, 396, 398, 412, 418, 414, 465, 466, 467

(56) References Cited

U.S. PATENT DOCUMENTS

| | | |
|---|---|---|
| 4,644,534 | 2/1987 | Sperlich . |
| 4,686,672 | 8/1987 | Namiki . |
| 5,754,530 * | 5/1998 | Awdeh et al. ........................ 370/232 |
| 5,910,942 * | 6/1999 | Grenot et al. ........................ 370/236 |
| 5,953,312 * | 6/1999 | Crawley et al. ..................... 370/218 |
| 6,049,526 * | 4/2000 | Radhakrishnan et al. .......... 370/229 |

OTHER PUBLICATIONS

Hasegawa et al, Performance of TCP over ABR service class, 1996, Global Telecommunications Conference, 1996. GLOBECOM '96.Communicati Key to Global Prosperity, vol. 3, 1996, pp. 1935–1941.*

Kalyanaraman et al., The Erica switch algorithm for ABR traffic management in ATM, Feb. 2000, Networking, IEE/ACM Transactions vol. 8 Issue 1, pp. 87–98.*

* cited by examiner

Primary Examiner—Chau Nguyen
Assistant Examiner—Alexander O. Boakye
(74) Attorney, Agent, or Firm—Ansel M. Schwartz

(57) ABSTRACT

An ATM communications system. The system includes an ATM network on which ABR traffic having ABR connections travel and UBR traffic having UBR connections travel. The system includes a first source node which produces UBR traffic connected to the ATM network. The system includes a first UBR-ABR gateway which is connected to the ATM network and which receives the UBR traffic and converts the UBR traffic to ABR traffic. The system includes a second UBR-ABR gateway which is connected to the ATM network and which receives ABR traffic and converts the ABR traffic to UBR traffic. The system includes a destination node connected to the ATM network which receives the UBR traffic. A UBR-ABR gateway regarding ABR traffic having ABR connections and UBR traffic having UBR connections. The gateway includes at least one input port for receiving UBR traffic. The gateway includes a controller which converts the UBR traffic to ABR traffic. The gateway includes at least one output port for sending the ABR traffic from the switch. A method for sending ABR and UBR traffic over an ATM network.

13 Claims, 2 Drawing Sheets

ATM COMMUNICATIONS SYSTEM, UBR-ABR GATEWAY, AND METHOD

FIELD OF THE INVENTION

The present invention pertains to ABR and UBR service in an ATM network. More specifically, the present invention pertains to converting UBR service to ABR service, or ABR service to UBR service with a UBR-ABR gateway.

BACKGROUND OF THE INVENTION

ABR as defined in the ATM Forum standard provides a flow control mechanism intended for non-real time traffic. Implementation of ABR within the network could lead to an efficient utilization of network resources. UBR service, on the other hand, provides a non-controlled flow of non-real time data through the network in a "best effort" mode. For instance, if congestion occurs at some middle switch which causes ATM cells or ATM packets to be dropped at the middle stage switch, then the utilization of these subsequently dropped cells or packets in the preceding switches is wasted. The present invention relates to the mapping of UBR services to ABR service at the edge of the network in order to provide a flow control mechanism for UBR traffic thus yielding an efficient utilization of the network resource. Let the mechanism that maps UBR to ABR to be named as UBR-ABR gateway.

Mapping of UBR traffic to ABR traffic allows an efficient utilization of the network resources. Although ABR services is provided in the forthcoming switches, many adaptor cards and uplink cards at the edge of the network do not have ABR functionality. These hosts at the edge of the network have no choice but to use ABR service for their non-real time data traffic. UBR-ABR gateway, as disclosed, would get the best features of ABR service for UBR traffic generated at the edge of the network. End hosts are not aware of such gateway and they would definitely notice better performance in terms of cell loss and delay.

SUMMARY OF THE INVENTION

The present invention pertains to an ATM communications system. The system comprises an ATM network on which ABR traffic having ABR connections travel and UBR traffic having UBR connections travel. The system comprises a first source node which produces UBR traffic connected to the ATM network. The system comprises a first UBR-ABR gateway which is connected to the ATM network and which receives the UBR traffic and converts the UBR traffic to ABR traffic. The system comprises a second UBR-ABR gateway which is connected to the ATM network and which receives ABR traffic and converts the ABR traffic to UBR traffic. The system comprises a destination node connected to the ATM network which receives the UBR traffic.

The present invention pertains to a UBR-ABR gateway regarding ABR traffic having ABR connections and UBR traffic having UBR connections. The gateway comprises at least one input port for receiving UBR traffic. The gateway comprises a controller which converts the UBR traffic to ABR traffic. The gateway comprises at least one output port for sending the ABR traffic from the switch.

The system comprises a method for sending ABR and UBR traffic over an ATM network. The method comprises the steps of producing UBR traffic having UBR connections at a source node. Then there is the step of sending the UBR traffic to a first UBR-ABR gateway through the ATM network to which the UBR-ABR gateway is connected. Then there is the step of converting the UBR traffic to ABR traffic with a first UBR-ABR gateway. Next there is the step of sending the ABR traffic to a second UBR-ABR gateway through the ATM network to which the second UBR-ABR gateway is connected. Next there is the step of converting the ABR traffic to UBR traffic with the second UBR-ABR gateway. Then there is the step of sending the UBR traffic to a destination node through the ATM network to which the destination node is connected.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
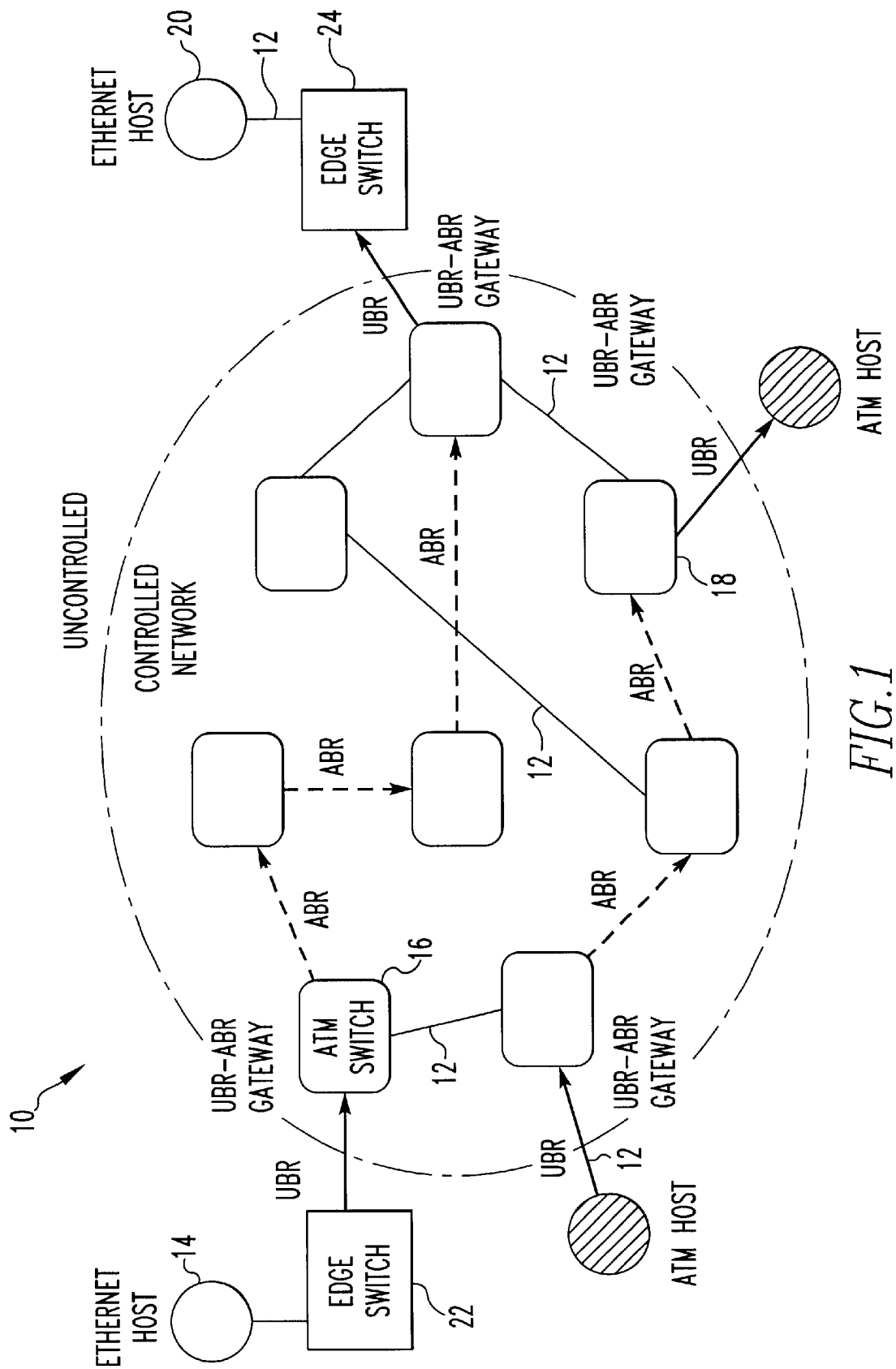
FIG. 1 is a schematic representation of an ATM communications system of the present invention.

Referring now to the drawings wherein like reference numerals refer to similar or identical parts throughout the several views, and more specifically to FIG. 1 thereof, there is shown an ATM communications system 10. The system 10 comprises an ATM network 12 on which ABR traffic having ABR connections travel and UBR traffic having UBR connections travel. The system 10 comprises a first source node 12 which produces UBR traffic connected to the ATM network 12. The system 10 comprises a first UBR-ABR gateway 16 which is connected to the ATM network 12 and which receives the UBR traffic and converts the UBR traffic to ABR traffic. The system 10 comprises a second UBR-ABR gateway 18 which is connected to the ATM network 12 and which receives ABR traffic and converts the ABR traffic to UBR traffic. The system 10 comprises a destination node 20 connected to the ATM network 12 which receives the UBR traffic.

Preferably, the first UBR-ABR gateway 16 acts as a virtual source of ABR service and the second UBR-ABR gateway 18 acts as a virtual destination of ABR service. The system 10 preferably includes a first switch 22 connected to the ATM network 12 between the source node 12 and the first UBR-ABR gateway 16. Preferably, the system 10 includes a second switch 24 connected to the ATM network 12 between the second UBR-ABR gateway 18 and the destination node 20.

Figure 2:
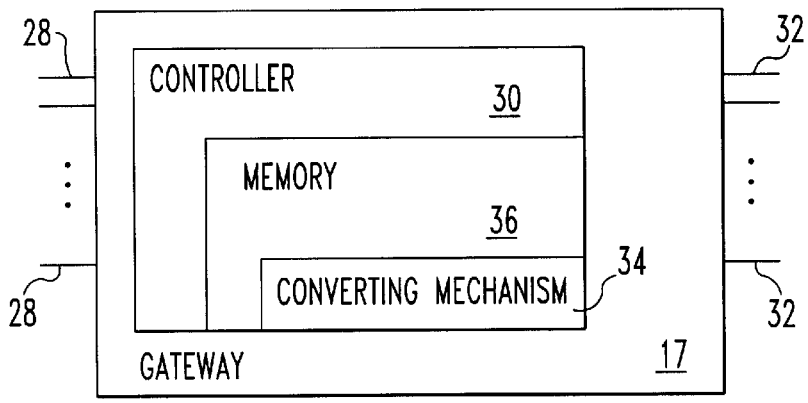
FIG. 2 is a schematic representation of a UBR-ABR gateway.

The present invention pertains to a UBR-ABR gateway 17 regarding ABR traffic having ABR connections and UBR traffic having UBR connections, as shown in FIG. 2. The gateway 17 comprises at least one input port 28 for receiving UBR traffic. The gateway 17 comprises a controller 30 which converts the UBR traffic to ABR traffic. The gateway 17 comprises at least one output port 32 for sending the ABR traffic from the switch.

Preferably, the input port 28 also receives ABR traffic, the controller 30 also converts ABR traffic it receives into UBR traffic, and the output port 32 also sends UBR traffic from the switch. The controller 30 preferably includes a mechanism 34 for converting the UBR traffic to ABR traffic and for converting ABR traffic to UBR traffic. Preferably, the controller 30 includes a memory 36 in which the converting mechanism 34 is disposed.

Each UBR connection preferably has UBR PCR parameters, each ABR connection has ABR PCR parameters, and the converting mechanism 34 maps a UBR PCR connection to an ABR PCR connection. Preferably, each ABR connection has an MCR which is set to zero or a positive integer.

Figure 3:
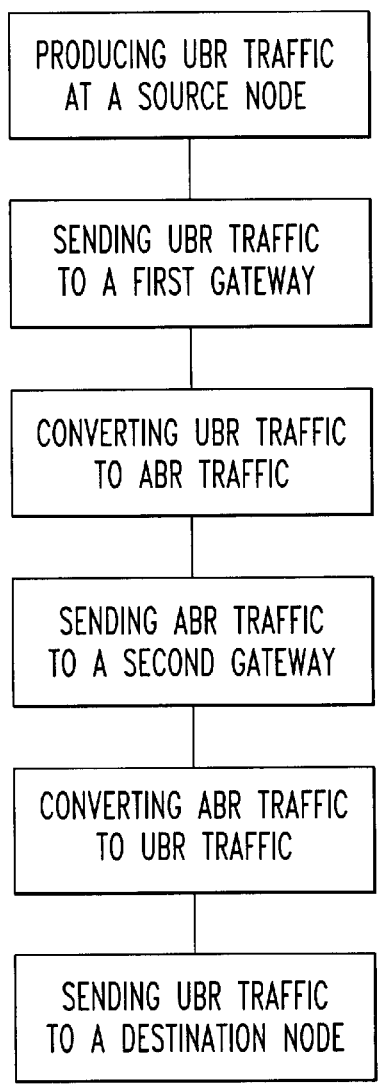
FIG. 3 is a flow chart of the method of the present invention.

The system 10 comprises a method for sending ABR and UBR traffic over an ATM network 12, as shown in FIG. 3. The method comprises the steps of producing UBR traffic having UBR connections at a source node 12. Then there is the step of sending the UBR traffic to a first UBR-ABR gateway 16 through the ATM network 12 to which the first UBR-ABR gateway 16 is connected. Then there is the step of converting the UBR traffic to ABR traffic with a first UBR-ABR gateway 16. Next there is the step of sending the ABR traffic to a second UBR-ABR gateway 18 through the ATM network 12 to which the second UBR-ABR gateway 18 is connected. Next there is the step of converting the ABR traffic to UBR traffic with the second UBR-ABR gateway 18. Then there is the step of sending the UBR traffic to a destination node 20 through the ATM network 12 to which the destination node 20 is connected.

Preferably, the converting the UBR traffic to ABR traffic includes the steps of mapping a UBR connection's PCR to an ABR connection's PCR. The mapping step preferably includes the step of setting an MCR of the ABR connection to zero or a positive integer.

Source nodes 12 and destination nodes 20, which include end-hosts such as Ethernet hosts or ATM hosts, are not aware of a UBR-ABR gateway and should not be concerned with it. As far as end-hosts are concerned, they are sending UBR traffic. A UBR-ABR gateway benefits both the end-hosts and the network 12 in terms of increased performance and resource utilization. The transfer of ABR or UBR traffic in and of itself is well known and defined in ATM Forum document TM 4.0 and the associated signaling is defined in ATM Forum document UNI 4.0 both of which are incorporated by reference herein. FIG. 1 shows a traffic scenario of the system 10. After network management software has identified which entities of the ATM network 12 have ABR service and which only have UBR, as is well known in the art, Ethernet hosts communicate through the edge switches and ATM network 12. Packets from the Ethernet host are sent to the first edge switch with an ATM uplink. If the ATM uplink is not capable of providing ABR service, it resorts to UBR service for the packets. When this UBR connection is being set up, the UBR-ABR gateway maps the UBR connection to ABR service using UPC parameters of UBR connection, namely PCR. UBR's PCR is mapped in a 1 to 1 correspondence to ABR's PCR. MCR of the ABR connection (which is the only difference between the ABR connection and the UBR connection) could either be set to 0 or a positive number if a certain application is known to require such minimum bandwidth a priori. When the ABR connection is set up within the network 12, the first ATM switch having ABR service in the connection path acts as VS (Virtual Source) of ABR service and the last switch having ABR service along the path acts as VD (virtual Destination). However, it is not required that all switches in the network 12 are VS/VD capable. It is possible to take advantage of the ABR as long as there are at least two switches with VS/VD capability that are connected together. When the ABR connection reaches the second edge switch, it is mapped back to UBR service the same way it was mapped into ABR service, except the MCR is ignored since UBR service does not have MCR. Again, the same set up is required for communication among ATM hosts without ABR functions. The existence of the UBR-ABR gateway does not require any changes in the standard and is transparent to users.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An ATM communications system comprising:

an ATM network having ABR connections along which ABR traffic travel and having UBR connections along which UBR traffic travel;

a first source node which produces UBR traffic connected to the ATM network;

a first UBR-ABR gateway which is connected to the ATM network and which receives the UBR traffic and converts the UBR traffic to ABR traffic;

a second UBR-ABR gateway which is connected to the ATM network and which receives ABR traffic and converts the ABR traffic to UBR traffic; and a destination node connected to the ATM network which receives the UBR traffic.

2. A system as described in claim 1 wherein the first UBR-ABR gateway acts as a virtual source of ABR service and the second UBR-ABR gateway acts as a virtual destination of ABR service.

3. A system as described in claim 2 including a first switch connected to the ATM network between the source node and the first UBR-ABR gateway.

4. A system as described in claim 3 including a second switch connected to the ATM network between the second UBR-ABR gateway and the destination node.

5. A UBR-ABR gateway of an ATM network which includes a switch, the UBR-ABR gateway regarding ABR traffic having ABR connections and UBR traffic having UBR connections comprising:

at least one input port for receiving UBR traffic;

a controller which converts the UBR traffic to ABR traffic; and at least one output port for sending the ABR traffic from the switch.

6. A gateway as described in claim 5 wherein the input port also for receiving ABR traffic, the controller also converts ABR traffic it receives into UBR traffic, and the output port also for sending UBR traffic from the switch.

7. A gateway as described in claim 6 wherein the controller includes a mechanism for converting the UBR traffic to ABR traffic and for converting ABR traffic to UBR traffic.

8. A gateway as described in claim 7 wherein the controller includes a memory in which the converting mechanism is disposed.

9. A gateway as described in claim 8 wherein each UBR connection has UBR PCR parameters, each ABR connection has ABR PCR parameters, and the converting mechanism maps a UBR PCR connection to an ABR PCR connection.

10. A gateway as described in claim 9 wherein each ABR connection has an MCR which is set to zero or a positive integer.

11. A method for sending ABR and UBR traffic over an ATM network comprising the steps of:

producing UBR traffic having UBR connections at a source node;

sending the UBR traffic to a first UBR-ABR gateway through the ATM network to which the UBR-ABR gateway is connected;

converting the UBR traffic to ABR traffic with a first UBR-ABR gateway;

sending the ABR traffic to a second UBR-ABR gateway through the ATM network to which the second UBR-ABR gateway is connected;

converting the ABR traffic to UBR traffic with the second UBR-ABR gateway; and sending the UBR traffic to a destination node through the ATM network to which the destination node is connected.

12. A method as described in claim 11 wherein the converting the UBR traffic to ABR traffic includes the steps of mapping a UBR connection's PCR to an ABR connection's PCR.

13. A method as described in claim 12 wherein the mapping step includes the step of setting an MCR of the ABR connection to zero or a positive integer.

* * * * *